March 4, 1924.　　　　　　　　　　　　　　　1,486,097
E. G. LOOMIS
PROCESS AND APPARATUS FOR PURIFYING CAMPHOR
Filed March 16, 1918　　　2 Sheets-Sheet 1
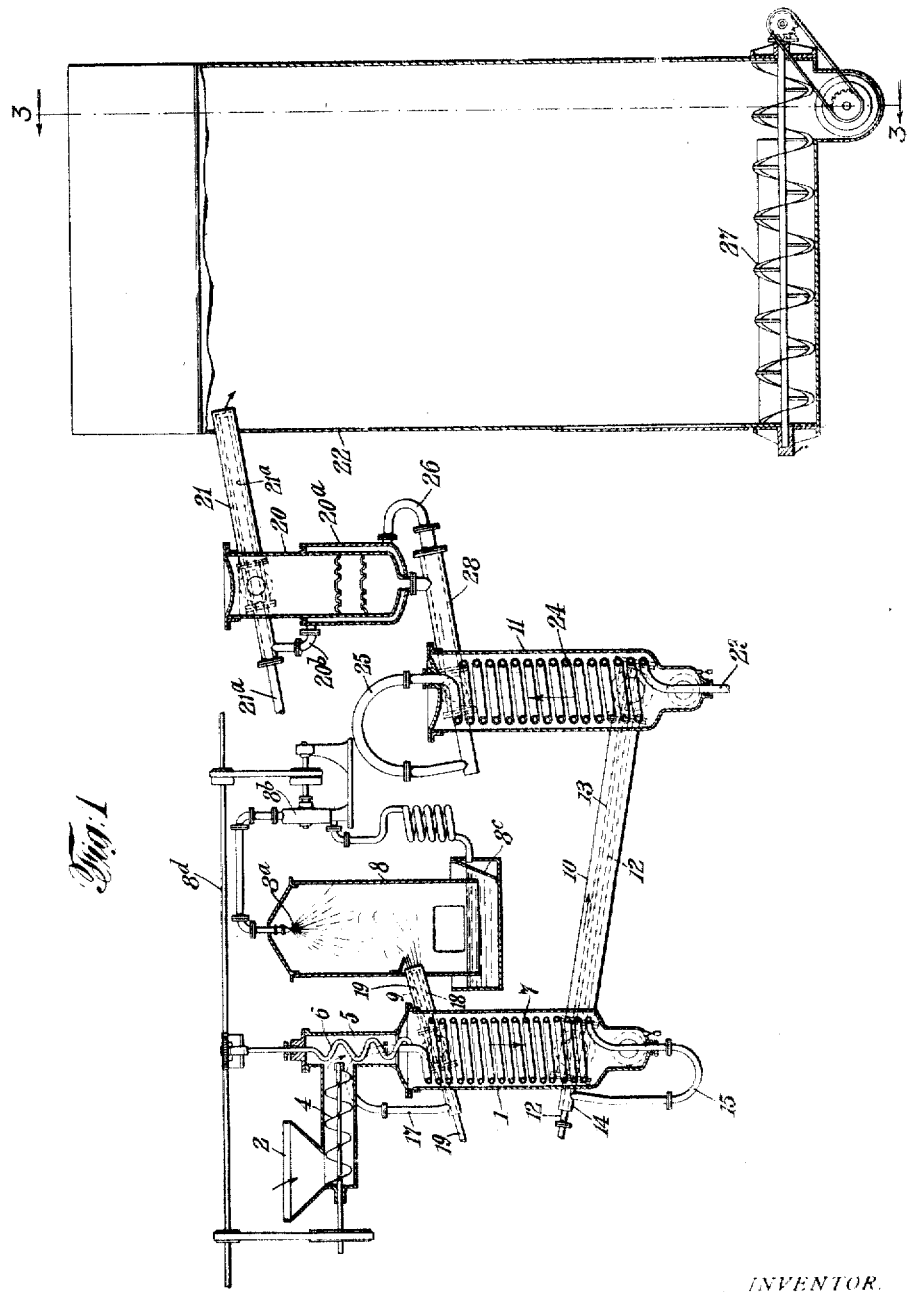

March 4, 1924.
E. G. LOOMIS
1,486,097
PROCESS AND APPARATUS FOR PURIFYING CAMPHOR
Filed March 16, 1918
2 Sheets-Sheet 2
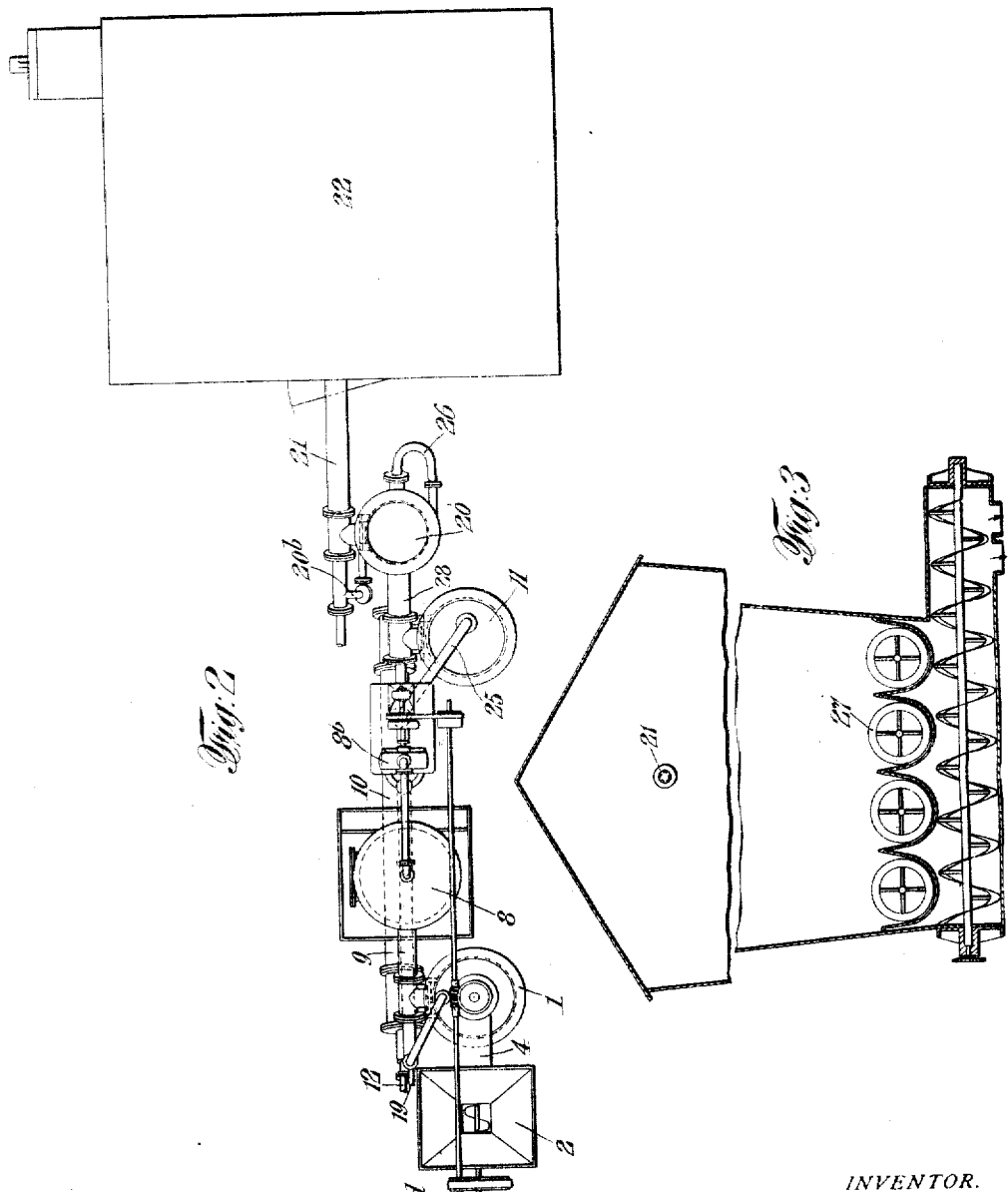

Patented Mar. 4, 1924.

1,486,097

UNITED STATES PATENT OFFICE.

EVARTS G. LOOMIS, OF NEWARK, NEW JERSEY, ASSIGNOR TO E. I. DU PONT DE NEMOURS AND COMPANY, OF WILMINGTON, DELAWARE, A CORPORATION OF DELAWARE.

PROCESS AND APPARATUS FOR PURIFYING CAMPHOR

Application filed March 16, 1918. Serial No. 222,859.

*To all whom it may concern:*

Be it known that I, EVARTS G. LOOMIS, of Newark, in the county of Essex and in the State of New Jersey, have invented a certain new and useful Improvement in Processes and Apparatus for Purifying Camphor, and do hereby declare that the following is a full, clear, and exact description thereof.

The object of my invention has been to provide a process and apparatus for practicing such process, by which camphor may be purified rapidly and at low cost, and especially such a process and apparatus by which crude camphor can be introduced continuously into the apparatus and refined camphor continuously removed therefrom, whereby a large output and low cost for labor and heat is obtained.

In the accompanying drawing is shown, somewhat diagrammatically, an apparatus embodying my invention, which, while it is the best embodiment known to me, is to be regarded as typical only of many possible embodiments, and my invention is not to be confined thereto.

In the said drawings,

Figure 1 is a vertical longitudinal sectional view of an apparatus embodying my invention;

Figure 2 is a top plan view of the apparatus shown in Figure 1;

Figure 3 is a vertical sectional view of the camphor condenser on the line 3—3 of Figure 1.

Camphor contains as impurities camphor oil, resinous impurities, water and dirt. Prior to my invention, camphor, to be purified, has been subjected to a heating operation, which has the effect of changing the character of the camphor oil so as to permit it to be readily separated from the camphor. By my invention, however, such process can be greatly facilitated.

The apparatus shown in the accompanying drawing comprises a melting pot 1, in which the crude camphor is to be melted. Means for introducing the camphor into the pot without permitting the vapors of camphor to escape, as shown, consist of a hopper 2, into which the crude camphor is conveyed in any manner, and the camphor is fed horizontally, as by a screw conveyer 4, to a vertical pipe 5, communicating with the interior of the melting pot, the pipe 5 having within it a screw conveyer 6, which takes the camphor from the conveyer 4 and forces it into the melting pot. The melting pot is heated in any desired manner, and is shown as heated by interior piping 7 conveying hot oil. The piping system will later be described. At a point at a level preferably above the melting pot, a steam condenser 8 is provided, and a pipe 9 extends from the upper end of the melting pot into the condenser to carry off any vapors of water, camphor, or camphor oil that may be formed in the melting pot. In the present instance, the condenser is shown as provided with a water spray $8^a$ at the top, supplied by a pump $8^b$. The condenser is provided at its foot with a water seal $8^c$. The screws 4 and 6 and pump $8^b$ are shown as driven by a horizontal shaft $8^d$. The lower end of the melting pot is connected by a pipe 10 with the lower end of a vaporizer 11. I prefer that the pipe 10 should slope downward considered in a direction toward the vaporizer, and believe that I obtain a more successful baking and transformation of the impurities and a more ready separation of them from the camphor than if the pipe be level or slope upward. The pipe 10, as well as the melting pot, is heated with a hot oil heating system, preferably internal. The hot oil heating system, as illustrated, consists of a pipe 12 passing through the pipe 10, and opening against the closed end of a larger pipe 13, which encloses the pipe 12, and which, itself, is contained within the pipe 10. The pipe 13 serves to return the oil to a head 14, where it passes into a pipe 15 that rises into the melting pot and forms the coil 7, the upper end of which coil, by a pipe 17, connects with a pipe 18 that is contained within the pipe 9, connecting the melting pot with the water condenser, and the oil, after rising to the top of the pipe 18, descends through an internal pipe 19 and returns to the heater.

The camphor is largely baked in its passage through the pipe 10, which is of such a length that the desired amount of time is consumed in the passage of the camphor therethrough to effect the baking. Within the the lower end of the vaporizer a sufficient body of the molten camphor is retained to form a liquid seal over the end of the pipe 10, and prevent the vapors of camphor from passing back into the melting pot and attempting to escape through the entrance thereto, but in the upper part of the vaporizer vapors of camphor are formed and, after passing through the scrubber 20, are carried off through a pipe 21 to a condenser 22 of any desired form. The vaporizer is heated by a hot oil pipe 23 preferably contained within the vaporizer, and constructed in the form of a coil 24. The upper end of the coil is connected by a pipe 25 that heats the connection 28 to the scrubber.

In the operation of the described apparatus in the refining of camphor, the crude camphor in the hopper 2 is fed horizontally forward by the screw conveyer 4 to the vertical screw conveyer 6, which latter feeds it down into the melting pot. The camphor is there melted, and, although fumes of camphor rise to some extent and tend to escape past the screw conveyers, the mass of camphor carried by the conveyers condenses the fumes so that practically no camphor is lost in this way. The melting vessel is kept at a temperature above the melting point of camphor and below its boiling point, so as both to melt the camphor and drive off the water. The vapors which escape to the condenser 8, therefore, contain only a small percentage of camphor, together with a little of the camphor oil. The vapors passing into the condenser 8 are condensed by the spray of water, and the camphor and camphor oil either fall to the bottom of the condenser or accumulate on the sides thereof, being washed down by the water spray, and the mixture of camphor and camphor oil is dipped out of the water seal at the foot of the condenser and charged back into the hopper again. The liquid material, consisting of the melted camphor and most of the camphor oil, flows from the lower end of the melting pot slowly through the pipe 10 to the vaporizer, and in its passage through the said pipe is heated and baked, so that the impurities, such as camphor oil and resinous matters, are modified either into non-volatile substances or substances which have a different volatility than camphor (or both), and by these changes in the substances they can be separated from the camphor. The camphor flows through the pipe 10 into the foot of the vaporizer 11 and carries with it the altered impurities, which latter settle in the foot of the vaporizer, from which they are removed from time to time. The liquid camphor in the lower portion of the vaporizer is heated to such a point that vapors of camphor rise from its surface, and, passing through the scrubber and through the pipe 21, pass off into the condenser 22, and may be then carried out of the condenser by a screw conveyer 27. As conventionally indicated in Figure 1, the scrubber is of the standard annular-pan "bubbler" type so that, as some of the camphor vapors are condensed in the upwardly facing pans, the remainder of the vapors, deflected into the upwardly facing pans by the downwardly facing pans, pass under the edges of the latter and bubble through the liquid camphor in the upwardly facing pans and so are scrubbed.

The scrubber is shown as heated by an oil jacket 20ª supplied with oil by the pipe 26. The pipe 21 is heated by return-flow oil pipes similar to the pipes 12 and 13 and the pipe 10, the oil being supplied by a pipe 20ᵇ, leading from the oil jacket, and escaping by a pipe 21ª.

My invention has, among others, the following advantages:

The camphor, being baked at a temperature above the melting point, is much more readily heated to the baking point than if it were baked in a solid condition, since the convection currents communicate the heat to the mass, camphor in a solid state being a very poor conductor of heat.

Baking the camphor in the molten condition also facilitates transferring the camphor to the next part of the apparatus, and makes possible that continuity of the process which is one of the prime objects of my invention. The separation of the camphor from its impurities by distilling it, and especially after it has been baked in a molten condition, results in the advantage of using the heat already in the camphor.

My process is a continuous one, in that camphor can be steadily and uniformly fed into the apparatus, beginning with the melting pot, and can be made to pass continuously through the apparatus to the condenser, and can be conveyed from the latter by the conveyer 27 continuously or at sufficiently frequent intervals to prevent the condenser from becoming filled. This continuity enormously increases the amount of camphor which can be refined in a given apparatus compared with intermittently refining it, and it results in a large saving of heat, since the parts which bake and otherwise treat the camphor in a heated condition are not alternately opened and closed, and therefore are not periodically chilled or reduced in temperature and again warmed up.

I claim:

1. An apparatus for purifying camphor comprising a melting vessel, a baking vessel communicating therewith, means for heating said two vessels, and a vaporizer communicating with said baking vessel, said heating means being located with respect to said baking vessel for prevention of cooling of the melted camphor in its passage from the melting through the baking vessel to the vaporizer, and the baking vessel and the vaporizer being relatively assembled and located to provide for the maintaining of a body of molten camphor in said vaporizer in sealing relation to said baking vessel.

2. An apparatus for purifying camphor comprising the combination of a melting vessel, a water condenser connected therewith, a baking vessel connected with said melting vessel, and a vaporizer connected with said baking vessel, said baking vessel and vaporizer being relatively located to provide for the maintaining of a body of molten camphor in said vaporizer in sealing relation to said baking vessel.

3. An apparatus for purifying camphor comprising the combination of a melting vessel, a spray condenser connected therewith, a baking vessel connected with said melting vessel, and a vaporizer connected with said baking vessel, said baking vessel and vaporizer being relatively located to provide for the maintaining of a body of molten camphor in said vaporizer in sealing relation to said baking vessel.

4. An apparatus for purifying camphor comprising a melting vessel for melting the camphor to a liquid, a camphor-retaining entrance to said vessel, above the normal level of the liquid camphor in said vessel, to hold camphor in amount to close the same, means for feeding the retained and closing camphor through said entrance, a baking vessel communicating with said melting vessel to receive liquid camphor therefrom, and a vaporizer connected to the baking vessel.

5. An apparatus for purifying camphor comprising the combination of a melting vessel for melting the camphor to a liquid, a camphor-retaining entrance to said vessel, above the normal level of the liquid camphor in said vessel, to hold camphor in amount to close the same, means for feeding the retained and closing camphor through said entrance, a condenser connected with said melting vessel, a baking vessel connected to said melting vessel for receiving liquid camphor therefrom, and a vaporizer connected to said baking vessel.

6. An apparatus for purifying camphor comprising the combination of a melting vessel, a camphor-retaining entrance thereto, to hold camphor in amount to close the same, means for feeding the retained and closing camphor through said entrance, a condenser connected with said melting vessel, a baking vessel connected to said melting vessel, a vaporizer connected to said baking vessel, and a scrubber connected with said vaporizer.

7. An apparatus for purifying camphor comprising the combination of a melting vessel, a camphor-retaining entrance thereto, to hold camphor in amount to close the same, means for feeding the retained and closing camphor through said entrance, a condenser connected with said melting vessel, a baking vessel connected to said melting vessel, a vaporizer connected to said baking vessel, a scrubber connected with said vaporizer, and a condenser connected with said scrubber.

8. An apparatus for purifying camphor comprising the combination of a melting vessel, a baking vessel connected with said melting vessel, a vaporizer connected with said baking vessel, a scrubber connected with said vaporizer, and a condenser connected with such scrubber.

9. An apparatus for purifying camphor comprising the combination of a melting vessel, a baking vessel connected with said melting vessel, a vaporizer connected with said baking vessel, a scrubber connected with said vaporizer, a condenser connected with such scrubber, and means for conveying condensed camphor from said condenser.

10. An apparatus for purifying camphor comprising the combination of a melting vessel, a baking vessel connected with said melting vessel, a vaporizer connected with said baking vessel, a scrubber connected with said vaporizer, a condenser connected with such scrubber, and mean for positively moving solid condensed camphor from said condenser, said means comprising a screw conveyor.

11. An apparatus for purifying camphor comprising the combination of a melting pot, a vaporizer, and a pipe connecting them, and means for heating said pipe to bake camphor while passing therethrough, said heating means and said pipe being located with respect to each other for prevention of cooling and solidifying of the camphor during its flow from the pot to the vaporizer.

12. An apparatus for purifying camphor comprising the combination of a melting pot, a vaporizer, a pipe connecting them, and means for heating said pipe to bake camphor while passing therethrough, said pipe sloping toward the vaporizer with its ends at different levels.

13. An apparatus for purifying camphor comprising the combination of a melting pot, a vaporizer, a pipe connecting them, and means for heating said pipe to bake camphor while passing therethrough, such means comprising means for circulating a heating fluid along the length of said pipe, said pipe sloping toward the vaporizer with its ends at different levels.

14. An apparatus for purifying camphor comprising the combination of a melting pot, a vaporizer, a pipe connecting them, and means for heating said pipe to bake camphor while passing therethrough, said pipe sloping toward the vaporizer with its ends at different levels.

15. An apparatus for purifying camphor comprising the combination of a melting pot, a vaporizer, a pipe connecting them, and means for heating said pipe to bake camphor while passing therethrough, said pipe sloping downward in a forward direction with its ends at different levels.

16. The continuous process of refining camphor which comprises the progressive treatment of successive portions thereof by heating the camphor by applying heat to the camphor at a temperature above the melting point, and baking it at a temperature below the vaporizing point, and performing such heating and baking as separate and distinct steps; whereby the different and successive portions of camphor may be simultaneously treated, each in a respective one of the progressive steps.

17. The continuous process of refining camphor which comprises the progressive treatment of successive portions thereof by heating the camphor by applying heat to the camphor at a temperature above the melting point, baking it at a temperature below the vaporizing point, and separating the impurities, and performing such heating, baking and separating as separate and distinct steps; whereby the different and successive portions of camphor may be simultaneously treated, each in a respective one of the progressive steps.

18. The continuous process of refining camphor which comprises the progressive treatment of successive portions thereof by heating the camphor by applying heat to the camphor at a temperature above the melting point, baking it at a temperature below the vaporizing point, and vaporizing the camphor, and performing such heating, baking and vaporizing as separate and distinct steps; whereby the different and successive portions of camphor may be simultaneously treated, each in a respective one of the progressive steps.

19. The continuous process of refining camphor which comprises the progressive treatment of successive portions thereof by heating the camphor by applying heat to the camphor at a temperature above the melting point, baking it at a temperature below the vaporizing point, and vaporizing and scrubbing the camphor, and performing such heating, baking, vaporizing and scrubbing as separate and distinct steps; whereby the different and successive portions of camphor may be simultaneously treated, each in a respective one of the progressive steps.

20. The continuous process of refining camphor which comprises the progressive treatment of successive portions thereof by heating the camphor by applying heat to the camphor at a temperature above the melting point, baking it at a temperature below the vaporizing point, vaporizing the camphor, and condensing the same, and performing such heating, baking, vaporizing and condensing as separate and distinct steps; whereby the different and successive portions of camphor may be simultaneously treated, each in a respective one of the progressive steps.

21. The continuous process of refining camphor which comprises the progressive treatment of successive portions thereof by heating the camphor by applying heat to the camphor at a temperature above the melting point, baking it at a temperature below the vaporizing point, vaporizing and scrubbing the camphor, and condensing the same, and performing such heating, baking, vaporizing and scrubbing, and condensing as separate and distinct steps; whereby the different and successive portions of camphor may be simultaneously treated, each in a respective one of the progressive steps.

22. The continuous process of refining camphor comprising continuously and progressively melting the camphor, and continuously and progressively baking the camphor at a different location from that in which it was melted.

23. The continuous process of purifying camphor comprising continuously and progressively melting the camphor, baking the camphor in a different location from that in which it was melted, and progressively and continuously separating the camphor from its impurities.

24. The continuous process of purifying camphor comprising continuously and progressively melting the camphor, baking the camphor in a different location from that in which it was melted, progressively and continuously separating the camphor from its impurities, and progressively and continuously solidifying the camphor.

25. The continuous process of purifying camphor comprising melting crude camphor, and separating the volatile impurities, baking a continuous current of the molten camphor, and vaporizing said current of baked molten camphor while preventing the vapors of camphor from passing back into the melting vessel.

26. The continuous process of purifying camphor comprising melting crude camphor, and separating and condensing the volatile impurities, baking a continuous current of the molten camphor, and vaporizing said current of baked molten camphor while preventing the vapors of camphor from passing back into the melting vessel.

27. The continuous process of purifying camphor comprising continuously melting a continuous stream of crude camphor, and separating and condensing the volatile impurities, baking a continuous current of the molten camphor, vaporizing said current of baked molten camphor while preventing the vapors of camphor from passing back into the melting vessel.

28. The continuous process of purifying camphor comprising melting crude camphor, and separating the volatile impurities, baking a continuous current of the molten camphor, vaporizing said current of baked molten camphor while preventing the vapors of camphor from passing back into the melting vessel, and scrubbing said vapors of camphor.

29. The continuous process of purifying camphor comprising melting crude camphor, and separating and condensing the volatile impurities, baking a continuous current of the molten camphor, vaporizing said current of baked molten camphor while preventing the vapors of camphor from passing back into the melting vessel, and scrubbing said vapors of camphor.

30. The continuous process of purifying camphor comprising continuously melting a continuous stream of crude camphor, and separating and condensing the volatile impurities, baking a continuous current of the molten camphor, vaporizing said current of baked molten camphor while preventing the vapors of camphor from passing back into the melting vessel, and scrubbing said vapors of camphor.

31. The continuous process of purifying camphor comprising melting crude camphor, separating the volatile impurities, baking a continuous current of the molten camphor, vaporizing said current of baked molten camphor while preventing the vapors of camphor from passing back into the melting vessel, scrubbing said vapors of camphor, and condensing said scrubbed vapors of camphor.

32. The continuous process of purifying camphor comprising melting crude camphor, separating and condensing the volatile impurities, baking a continuous current of the molten camphor, vaporizing said current of baked molten camphor while preventing the vapors of camphor from passing back into the melting vessel, scrubbing said vapors of camphor, and condensing said scrubbed vapors of camphor.

33. The continuous process of purifying camphor comprising continuously melting a continuous stream of crude camphor, separating and condensing the volatile impurities, baking a continuous current of the molten camphor, vaporizing said current of baked molten camphor while preventing the vapors of camphor from passing back into the melting vessel, scrubbing said vapors of camphor, and condensing said scrubbed vapors of camphor.

In testimony that I claim the foregoing I have hereunto set my hand.

EVARTS G. LOOMIS.

Witnesses:
RUTH J. RIEMAN,
J. FREUDENVOLL.